United States Patent
Hirche et al.

(10) Patent No.: US 11,932,168 B2
(45) Date of Patent: Mar. 19, 2024

(54) METHOD AND DEVICE FOR ALERTING THE PRESENCE OF COMBINATION VEHICLES

(71) Applicant: Volvo Truck Corporation, Gothenburg (SE)

(72) Inventors: Mark Hirche, Hisings Kärra (SE); Patrik Blomdahl, Västra Frölunda (SE)

(73) Assignee: Volvo Truck Corporation, Gothenburg (SE)

(*) Notice: Subject to any disclaimer, the term of this patent is extended or adjusted under 35 U.S.C. 154(b) by 9 days.

(21) Appl. No.: 17/960,296

(22) Filed: Oct. 5, 2022

(65) Prior Publication Data

US 2023/0116681 A1 Apr. 13, 2023

(30) Foreign Application Priority Data

Oct. 8, 2021 (EP) .................................... 21201623

(51) Int. Cl.
*B60Q 5/00* (2006.01)
*B60Q 1/50* (2006.01)
*B60Q 1/54* (2006.01)

(52) U.S. Cl.
CPC ............ *B60Q 5/008* (2013.01); *B60Q 1/508* (2022.05); *B60Q 1/54* (2013.01)

(58) Field of Classification Search
CPC .......... B60Q 5/008; B60Q 1/508; B60Q 1/54; G08G 1/22; G08G 1/166
See application file for complete search history.

(56) References Cited

U.S. PATENT DOCUMENTS

| | | | |
|---|---|---|---|
| 2011/0313617 A1* | 12/2011 | Omote | B60Q 5/008 701/36 |
| 2017/0120804 A1 | 5/2017 | Kentley et al. | |
| 2018/0293812 A1 | 10/2018 | Miller et al. | |
| 2019/0084565 A1 | 3/2019 | Dudar | |
| 2019/0266644 A1 | 8/2019 | Cho et al. | |

FOREIGN PATENT DOCUMENTS

| | | | |
|---|---|---|---|
| CN | 208585337 U | * | 3/2019 |
| EP | 3199403 A1 | | 8/2017 |

OTHER PUBLICATIONS

Extended European Search Report for European Patent Application No. 21201623.2, dated Apr. 12, 2022, 8 pages.

* cited by examiner

*Primary Examiner* — Daryl C Pope
(74) *Attorney, Agent, or Firm* — Withrow & Terranova, PLLC

(57) ABSTRACT

A computer-implemented method performed for alerting the presence of one or more combination vehicles, each comprising a first vehicle unit and one or more second vehicle units and provided with a plurality of alerting units. Each respective first vehicle unit and respective one or more second vehicle units comprises a respective alerting unit out of the plurality of alerting units. The method comprises obtaining movement data indicative of one or both of a current movement or an expected movement of the one or more combination vehicles from at least one data communicating unit comprised in any one of the one or more combination vehicles. The method further comprises determining the current movement and/or the expected movement of the one or more combination vehicles. The method further comprises triggering a sound alert on the plurality of alerting units.

14 Claims, 6 Drawing Sheets

METHOD AND DEVICE FOR ALERTING THE PRESENCE OF COMBINATION VEHICLES

RELATED APPLICATIONS

The present application claims priority to European Patent Application No. 21201623.2, filed on Oct. 8, 2021, and entitled "METHOD AND DEVICE FOR ALERTING THE PRESENCE OF COMBINATION VEHICLES," which is incorporated herein by reference in its entirety.

TECHNICAL FIELD

The invention relates to a computer-implemented method and a control unit. The invention further relates to a combination vehicle, an alerting arrangement, a computer program and a computer program medium. In particular, embodiments herein relate to alerting a presence of one or more combination vehicles.

Although the invention will be described with respect to one or more combination vehicles such as one or more truck tractors with respective one or more trailers, the invention is not restricted to these particular vehicles, but may also be used in other vehicles comprising at least two vehicle units.

BACKGROUND

To improve the safety of road users, Acoustic Vehicle Alerting Systems (AVAS) have been developed to notify road users of the presence of quiet vehicles. In particular, AVAS ensure that road users are notified of a quiet vehicle by means of the AVAS triggering a sound alert of a speaker attached to the quiet vehicle. The quiet vehicle may be an electric vehicle, or a hybrid vehicle operated without using a combustion engine, which consequently does not generate enough noise to notify road users of its presence. The sound alert triggered by AVAS is typically only triggered at slow speeds. When driving at high speeds, the noise generated by tires interacting with the road as well as aerodynamic wind noise is typically sufficient to notify road users of the presence of the quiet vehicle.

AVAS may further notify road users of the activity and travel direction of a quiet vehicle by means of changing the volume and frequency of the emitted sound alert. For example, the frequency of the sound alert may increase and/or decrease depending on the speed of the vehicle and the sound types may also be adapted depending on if the quiet vehicle is moving forward or in reverse direction.

By the use of AVAS, it is thus possible to improve traffic safety, such that pedestrians and other road users can better understand and take preventive measures when being notified of quite vehicles and their specific actions. In particular, pedestrians who are visually impaired or otherwise rely on their hearing can more easily detect the presence of a nearby quiet vehicle.

While a typical AVAS improves the safety for road users in many situations, dangerous situations may still occur. For example, from a road user's perspective, it may be difficult to understand whether or not a quiet vehicle is approaching or driving away. The difficulty increases with the size and number of parts of the quiet vehicle. While it may be possible to hear an increase in sound volume of an approaching sound alert, this may prove difficult when there is a lot of nearby noise. Furthermore, the volume of the sound alert at the location of the road user may be too low for the road user to notice the quiet vehicle. This may be the case even when it is intended for the road user to be able to be notified about the quite vehicle at that distance. This may be caused by several factors. For example, the sound alert may simply be triggered at too low sound volume. Furthermore, the noise surrounding the road user and the quiet vehicle may cause the sound alert to be difficult to hear. Furthermore, the longer the sound needs to travel, the likelier it is that the sound volume has dropped to levels too low for the road user to be efficiently notified of the presence of the quiet vehicle.

While some of these problems may be at least partially solved by simply increasing the volume of the sound alert, this is not a feasible solution. For example, this may cause the sound alert to be too loud near the AVAS speaker, thus causing unnecessary ambient noise around the quiet vehicle. This may make it difficult for road users to hear other vehicles.

Furthermore, it may be difficult to trigger the sound alert such that a road user understands the size and appearance of the quiet vehicle. For example, when the road user hears a sound alert of a quiet vehicle comprising a truck tractor with a large number of trailers, the road user may instead expect a nearby small car. Consequently, the road user may not be able to react properly and may thus make poor traffic decisions leading to dangerous situations such as stepping out in the road at the wrong time.

SUMMARY

An object of the invention is to improve the safety of road users by alerting the presence of one or more combination vehicles. According to a first aspect of the invention, the object is achieved by a method according to claim 1.

According to the first aspect, there is provided a computer-implemented method for alerting the presence of one or more combination vehicles. Each combination vehicle out of the one or more combination vehicle comprises a first vehicle unit and one or more second vehicle units. The one or more combination vehicles is provided with a plurality of alerting units. Each respective first vehicle unit and each respective one or more second vehicle units comprises a respective alerting unit out of the plurality of alerting units. The computer-implemented method comprises:

- Obtaining movement data from at least one data communicating unit comprised in any one of the one or more combination vehicles. The movement data is indicative of one or both of a current movement or an expected movement of the one or more combination vehicles.
- Determining the current movement and/or the expected movement of the one or more combination vehicles based on the obtained movement data.
- Triggering a sound alert on the plurality of alerting units. The sound alert is triggered when any one or both of the current movement and the expected movement is non-zero, and when any one or both of the current movement and the expected movement of the one or more combination vehicles is/are less than at least one predetermined threshold.

Since the plurality of alerting units are provided on two separate vehicle units of the one or more combination vehicles, triggering the sound alert achieves an improved notification of the presence of the one or more combination vehicles and thus achieves an improved safety of road users.

Triggering the sound alert from multiple locations gives a wide range of advantages for road user safety. In particular, hearing the sound alert from the plurality of alerting units located at different vehicle units allows for an understanding of size of the one or more combination vehicles. This is since hearing the sound alert from a plurality of different directions gives an improved auditory depth perception when hearing the sound alert, and hence gives notified road users an indication of the size of the one or more combination vehicles. Due to the improved auditory depth perception, road users may also more easily determine whether or not the one or more combination vehicles is travelling towards, or away, from the road users. Hence, the improved auditory depth perception improves the road users' ability to make safe traffic decisions.

When the sound alert is triggered from multiple directions from the different vehicle units, a better sound quality at the location of the road users is ensured. This is since the effect of ambient noise surrounding the road user and the one or more combination vehicles is mitigated when emitting redundant sound from the plurality of alerting units at different locations.

Furthermore, since the sound alert is triggered from multiple locations, the sound alert is triggered closer to road users than if the sound alert is only triggered from one location. In this way, an improved maximum range of the sound alert is achieved. Sound emitted closer to the road users also lowers the risk of sound distortion, and thus allows for better preservation of an intended sound message of the sound alert.

Triggering the sound alert from multiple locations also enables the use of a lower sound volume of the sound alert, while still sufficiently being able to notify road users of the presence of the one or more combination vehicles at a medium distance. This is since the sound alert needs to travel a shorter distance and can rely on other sound alerts for redundancy. Sound emitted a shorter distance has the additional effect of reaching the road users quicker. In this way, necessary reaction times needed by the road users to take preventive measures is significantly reduced.

Additionally, since the current movement and/or expected movement is obtained, safety of road users is further improved. This is since the sound alert is triggered either when moving slowly and/or in anticipation of that the one or more combination vehicles will travel slowly. Hence, road users are notified well before a dangerous situation may occur.

According to exemplary embodiments herein, the movement data is obtained by obtaining a speed of the one or more combination vehicles. In these embodiments, the at least one predetermined threshold may comprise a speed threshold. The computer-implemented method may further comprise triggering the sound alert when the speed of the one or more combination vehicles is less than the speed threshold.

According to exemplary embodiments herein, the computer-implemented method may further comprise determining whether or not triggering the sound alert at a first sound volume is expected to fulfil a predetermined sound condition at an alerting distance from the one or more combination vehicles. The computer-implemented method may further comprise:

Triggering the sound alert at the first sound volume. Triggering the sound alert at the first sound volume may be performed when the triggering of the sound alert at the first sound volume is expected to fulfil the sound condition. The computer-implemented method may further comprise, adapting the sound alert to obtain a first adapted sound alert expected to fulfil the sound condition.

Adapting the sound alert to obtain the first adapted sound alert may be performed when the triggering of the sound alert at the first sound volume is expected to not fulfil the sound condition. In these embodiments, triggering the sound alert comprises triggering the first adapted sound alert.

According to exemplary embodiments herein, the at least one data communicating unit comprises a set of sound sensors for monitoring sound at the one or more combination vehicles. In these exemplary embodiments, the computer-implemented method may further comprise obtaining sound sensor data from the set of sound sensors. In these exemplary embodiments, determining whether or not triggering the sound alert at the first sound volume is expected to fulfil the sound condition is further based on the obtained sound sensor data.

According to exemplary embodiments herein, the at least one data communicating unit comprises a set of position sensors for monitoring one or more positions of respective one or more road users surrounding the one or more combination vehicles. In these exemplary embodiments, the computer-implemented method may further comprise obtaining one or more positions of the respective one or more road users surrounding the one or more combination vehicles from the set of position sensors. In these exemplary embodiments, determining whether or not triggering the sound alert at the first sound volume is expected to fulfil the sound condition may be performed by determining whether or not triggering the sound alert at the first sound volume is expected to fulfil the sound condition in at least one position of the one or more positions of the respective one or more road users surrounding the one or more combination vehicles. In these exemplary embodiments, the first adapted sound alert may be expected to fulfil the sound condition at the at least one position of the one or more positions of the respective one or more road users surrounding the one or more combination vehicles. These exemplary embodiments enable an improved notification of the presence of the one or more combination vehicles at the positions of the one or more road users, and thereby improve the safety of the one or more road users.

According to an exemplary embodiment herein, the computer-implemented method may further comprise triggering a light alert from the plurality of alerting units. The light alert may herein be triggered together with the sound alert.

According to an exemplary embodiment herein, the computer-implemented method may further comprise obtaining movement data indicative of any one or more out of: a velocity of the one or more combination vehicles, a travel direction of the one or more combination vehicles, an acceleration of the one or more combination vehicles, an acceleration of one or more out of the one or more second vehicle units, and a change in expected movement of the one or more combination vehicles.

According to an exemplary embodiment herein, the movement data is indicative of an acceleration of one or more out of the one or more second vehicle units. In some of these exemplary embodiments, the computer-implemented method may further comprise:

Adapting the sound alert to obtain a second adapted sound alert. Adapting the sound alert to obtain the second adapted sound alert may be performed when the acceleration of the one or more out of the one or more second vehicle units is above a predetermined acceleration threshold.

Triggering the second adapted sound alert.

According to an exemplary embodiment herein, the computer-implemented method may further comprise:

Detecting whether the one or more combination vehicles are travelling in reverse or forward, based on the movement data.

Triggering the sound alert with a first sound type. Triggering the sound alert with the first sound type may be performed when the one or more combination vehicles are travelling forward.

Triggering the sound alert with a second sound type. Triggering the sound alert with the second sound type may be performed when the one or more combination vehicles are travelling in reverse.

According to a second aspect, a control unit configured to perform the method according to the first aspect is provided.

According to a third aspect, an alerting arrangement for at least one combination vehicle is provided. The alerting arrangement comprises a control unit according to the second aspect, and a plurality of alerting units arranged in communicative connection with the control unit. Each alerting unit is configured to emit a sound alert in response to a triggering signal from the control unit.

In an exemplary embodiment, the control unit is arranged to be comprised in any one of the one or more combination vehicles, or the control unit is arranged in one of the alerting units out of the plurality of alerting units.

According to a fourth aspect, a computer program comprising program code means for performing the method of the first aspect when said program is run on a computer is provided.

According to a fifth aspect, a computer readable medium carrying a computer program comprising program code means for performing the method of the first aspect when said program product is run on a computer is provided.

According to a sixth aspect, a combination vehicle comprising a control unit according to the second aspect, or an alerting arrangement according to the third aspect is provided.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Embodiments herein relate to alerting the presence of combination vehicles. The term "combination vehicle" as used herein may be defined as a towing or pushing vehicle in combination with one or more vehicles, vehicle units, and/or other combination vehicles that are moving together, e.g. mechanically or wirelessly connected or controlled as one unit. An example of a combination vehicle is a truck tractor with one or more connected trailers.

Figure 1:
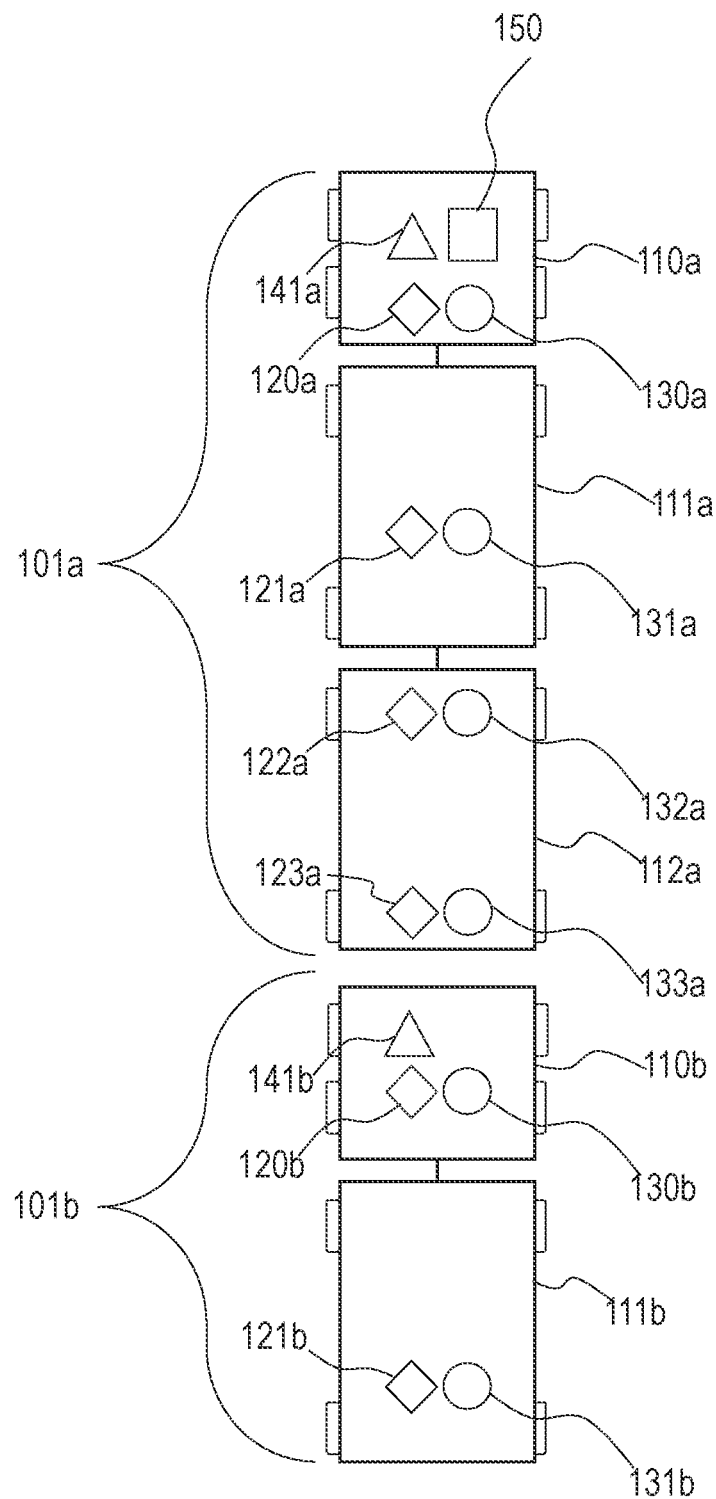
FIG. 1 is a schematic block diagram illustrating embodiments herein.

FIG. 1 is a schematic overview of one or more combination vehicles 101a, 101b in accordance with embodiments herein. The one or more combination vehicles 101a, 101b may be a single combination vehicle, or may also be a plurality of combination vehicles, e.g. forming a road trains and/or a platoon of combination vehicles 101a, 101b. As illustrated in FIG. 1, the one or more combination vehicles 101a, 101b may comprise a first combination vehicle 101a and/or a second combination vehicle 101b. The one or more combination vehicles 101a, 101b may comprise a leading combination vehicle, such as the first combination vehicle 101a. The leading combination vehicle may be wirelessly connected with the other vehicles of the one or more combination vehicles 101a, 101b and may be configured to control the movement of the one or more combination vehicles 101a, 101b, e.g. by pulling or pushing the one or more combination vehicles in any suitable direction. The one or more combination vehicles 101a, 101b may be quiet vehicles such as electrically driven vehicles or hybrid vehicles, e.g. without a combustion engine or with the possibility of driving without a combustion engine.

Each combination vehicle out of the one or more combination vehicles 101a, 101b comprises a first vehicle unit 110a, 110b and one or more second vehicle units 111a, 112a, 111b. Each first vehicle unit 110a, 110b may be a tractor or any other suitable vehicle capable of pulling or pushing its respective one or more second vehicle units 111a, 112a, 111b. Each of the one or more second vehicle unit 111a, 112a, 111b may typically comprise one or more trailers, or any other vehicle unit suitable for being pulled or pushed by its respective first vehicle unit 110a, 110b. As an example, FIG. 1 illustrates an example scenario where the first combination vehicle 101a comprises a first tractor 110a wherein the first tractor 110a is pulling two trailers 111a, 112a. In the example scenario of FIG. 1, the second combination vehicle 101b comprises a second tractor 110b, wherein the second tractor 110b is pulling one trailer 111b. Each combination vehicle out of the one or more combination vehicles 101a, 101b may be manually driven, remote controlled, or autonomous, e.g. driven automatically by means of a program.

The one or more combination vehicles 101a, 101b is provided with a plurality of alerting units 130a, 131a, 132a, 133a, 130b, 131b. The plurality of alerting units 130a, 131a, 132a, 133a, 130b, 131b may be attached to any of the one or more combination vehicles 101a, 101b. Each respective first vehicle unit 110a, 110b and respective one or more second vehicle units 111a, 112a, 111b comprises a respective alerting unit out of the plurality of alerting units 130a, 131a, 132a, 133a, 130b, 131b. While this means that each combination vehicle out of the one or more combination vehicles 101a, 101b may comprise a minimum of two alerting units 130a, 131a, 132a, 133a, 130b, 131b, preferably the plurality alerting units 130a, 131a, 132a, 133a, 130b, 131b comprises more than two alerting units. For example, in some embodiments there may be at least one alerting unit arranged in the rear of the last second vehicle unit of the one or more combination vehicles 101a, 101b. Additionally or alternatively, in some embodiments herein, there may be at least one, alerting unit, e.g. one, two, or three alerting units, arranged on each side of each of the one or more second vehicle units 111a, 112a, 111b. The plurality of alerting units 130a, 131a, 132a, 133a, 130b, 131b may in some embodiments be modular units which may be mounted at any suitable part of each of the one or more combination vehicles 101a, 101b.

A set of sensors 120a, 121a, 122a, 123a, 120b, 121b may be arranged in the one or more combination vehicles 101a, 101b as illustrated in FIG. 1. The set of sensors 120a, 121a, 122a, 123a, 120b, 121b may e.g. comprise sensors for measuring movement data of and/or the surrounding noise environment at the one or more combination vehicles 101a, 101b.

The one or more combination vehicles 101a, 101b may in some embodiments comprise one or more vehicle management control unit 141a, 141b. For example, a first vehicle management control unit 141a may be comprised in the first vehicle unit 110a as illustrated in FIG. 1. The one or more vehicle management control unit 141a, 141b may control the movement, e.g. speed, acceleration, braking, etc. of the one or more combination vehicles 101a, 101b.

Methods herein may be performed by any suitable computing device connected able to trigger a sound alert in the plurality of alerting units 130a, 131a, 132a, 133a, 130b, 131b, such as a control unit 150. The control unit 150 may be arranged in any suitable location for controlling and triggering the plurality of alerting units 130a, 131a, 132a, 133a, 130b, 131b for notifying road users of the presence of the one or more combination vehicles 101a, 101b. For example, the control unit 150 may be comprised in any of the one or more combination vehicles 101a, 101b, or in any of the plurality of alerting units 130a, 131a, 132a, 133a, 130b, 131b. The control unit 150 is configured to trigger a sound alert of the plurality of alerting units 130a, 131a, 132a, 133a, 130b, 131b, e.g. at various triggering conditions in embodiments herein. In this way, as will be explained with further embodiments herein, the plurality of alerting units 130a, 131a, 132a, 133a, 130b, 131b, may be triggered, e.g. by the control unit 150, to emit a sound alert for alerting road users of the presence of one or more combination vehicles 101a, 101b. The method may in some embodiments, at least partially, be performed by one of the alerting units out of the plurality of alerting units 130a, 131a, 132a, 133a, 130b, 131b.

Figure 2:
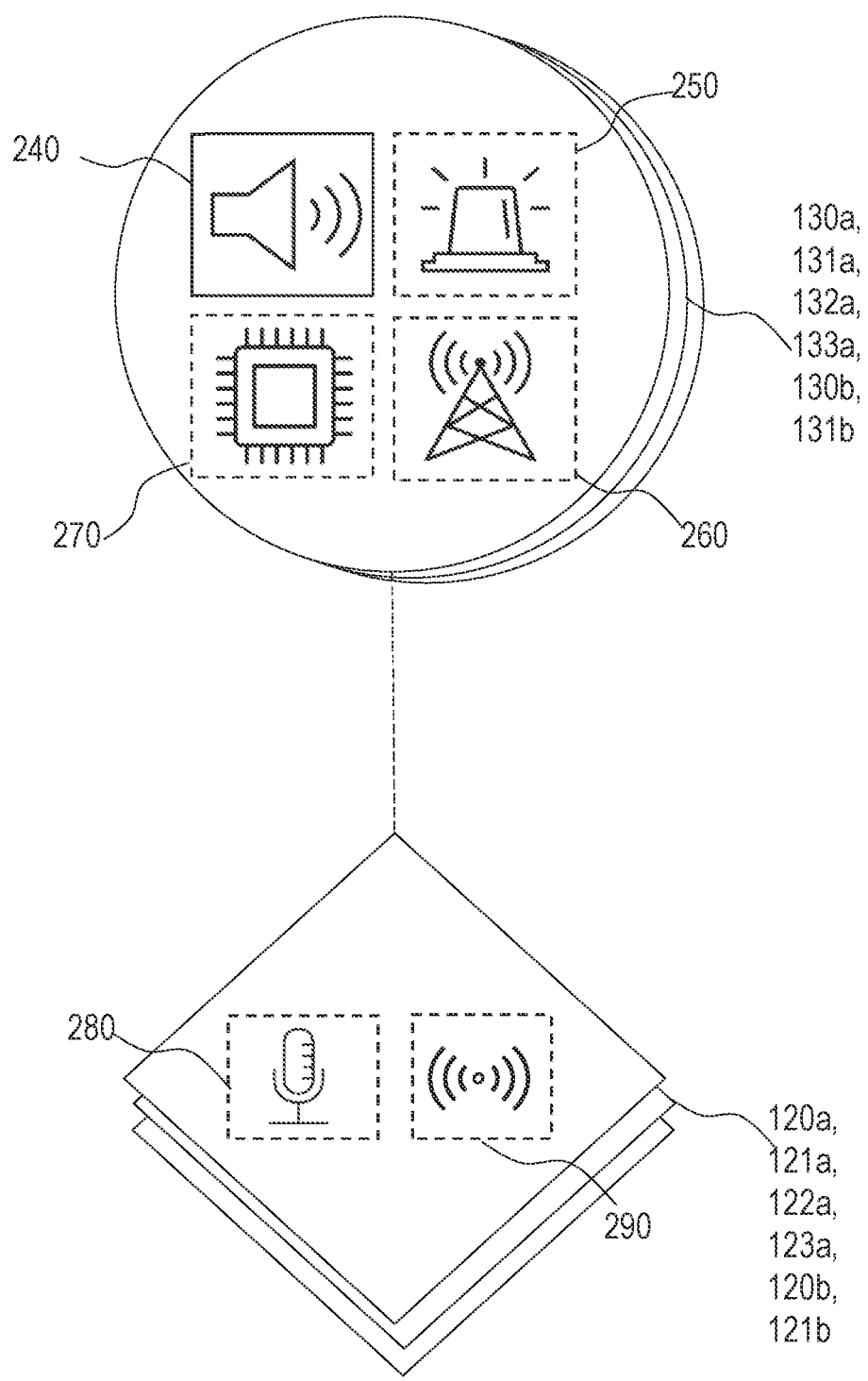
FIG. 2 is a schematic block diagram illustrating embodiments herein.

FIG. 2 illustrates internal components and capabilities of some of the plurality of alerting units 130a, 131a, 132a, 133a, 130b, 131b of some embodiments herein. FIG. 2 further illustrates internal components and capabilities of the set of sensors 120a, 121a, 122a, 123a, 120b, 121b of some embodiments herein.

Each of the plurality of alerting units 130a, 131a, 132a, 133a, 130b, 131b may respectively be connected to the control unit 150. The connection may preferably be a wireless connection, e.g. Wireless communication interface, Wireless Local Area Network (WLAN), Bluetooth, and/or Bluetooth Low Energy (BLE). The connection may additionally or alternatively comprise a wired connection.

Each sensor of the set of sensors 120a, 121a, 122a, 123a, 120b, 121b may respectively be connected to the control unit 150. The connection between the set of sensors 120a, 121a, 122a, 123a, 120b, 121b to the control unit 150 may preferably be a suitable wireless connection but may also be a wired connection. In some embodiments, the set of sensors 120a, 121a, 122a, 123a, 120b, 121b is connected to the control unit 150 via the plurality of alerting units 130a, 131a, 132a, 133a, 130b, 131b. In some embodiments herein, the plurality of alerting units 130a, 131a, 132a, 133a, 130b, 131b may comprise at least some sensor(s) of the set of sensors 120a, 121a, 122a, 123a, 120b, 121b.

Each respective alerting unit out of the plurality of alerting units 130a, 131a, 132a, 133a, 130b, 131b comprises a respective sound emitter 240, such as a speaker, e.g. a loudspeaker, for emitting the sound alert. Each respective sound emitter 240 may be able to direct sound in one or more directions. This may cause sound emitted from the respective sound emitter 240 to travel better in the directed respective one or more directions. The sound emitters of the plurality of alerting units 130a, 131a, 132a, 133a, 130b, 131b may also be used in combination such that they together achieve a directed sound towards a specific road user. The sound is directed based on known locations of the different sound emitters. Each respective alerting unit out of the plurality of alerting units 130a, 131a, 132a, 133a, 130b, 131b may be configured to emit the sound alert at a respective sound volume. The sound volume of each respective alerting unit out of the plurality of alerting units 130a, 131a, 132a, 133a, 130b, 131b may be controlled individually or collectively, e.g. by the control unit 150 or by manual configuration. When emitting the sound alert, each respective alerting unit out of the plurality of alerting units 130a, 131a, 132a, 133a, 130b, 131b may increase or decrease the frequency and/or sound of the sound based on the current and/or expected movement of the one or more combination vehicles 101a, 101b, e.g. by increasing the frequency and/or sound in response to an increase in the current and/or expected movement.

Each respective alerting unit out of the plurality of alerting units 130a, 131a, 132a, 133a, 130b, 131b may further comprise a respective light emitter 250, for emitting a light alert to further alert road users of the presence of the one or more combination vehicles 101a, 101b. Each respective light emitter 250 may be a bright warning lamp, e.g. colored in a suitable or prescribed color, or any other suitable light emitter for alerting road users of the presence of the one or more combination vehicles 101a, 101b. Each respective light emitter 250 may be able to change light intensity and/or color. Each respective light emitter 250 may be able to direct its respective emitted light alert.

Each respective alerting unit out of the plurality of alerting units 130a, 131a, 132a, 133a, 130b, 131b may further comprise a respective communications unit 260, e.g. for communicating with the other alerting units out of the plurality of alerting units 130a, 131a, 132a, 133a, 130b, 131b and/or for communicating with the control unit 150. Each respective communications unit 260 may comprise a receiver and a transmitter. Typically, each respective communicating unit 260 provides any suitable wireless communication, e.g. WLAN or BLE.

Each respective alerting unit out of the plurality of alerting units 130a, 131a, 132a, 133a, 130b, 131b may further comprise a respective computing unit 270, e.g. for controlling any one or more out of the respective sound emitter 240, the respective light emitter 250, and the respective communications unit 260. In some embodiments, the plurality of alerting units 130a, 131a, 132a, 133a, 130b, 131b may comprise a master alerting unit controlling the other alerting units. In these embodiments, the respective computing unit 270 of the master alerting unit may be used to perform the method according to embodiments herein.

Each respective alerting unit out of the plurality of alerting units 130a, 131a, 132a, 133a, 130b, 131b may comprise an independent power supply, e.g. being battery-driven. Each respective alerting unit out of the plurality of alerting units 130a, 131a, 132a, 133a, 130b, 131b may alternatively be powered by one or more power sources of the one or more combination vehicles 101a, 101b.

One or more out of the plurality of alerting units 130a, 131a, 132a, 133a, 130b, 131b may be arranged as relay stations, such that, when triggered e.g., by the control unit 150, to trigger a sound alert, this triggering may be relayed to one or more other alerting units out of the plurality of alerting units 130a, 131a, 132a, 133a, 130b, 131b. In this way, the control unit 150 may only need to be in communication with a few alerting units e.g. one alerting unit, out of the plurality of alerting units 130a, 131a, 132a, 133a, 130b, 131b, while still being able to trigger all the plurality of alerting units 130a, 131a, 132a, 133a, 130b, 131b, to emit their respective sound alert. In particular, this may be useful in embodiments when the control unit 150 is comprised in one of the alerting units out of the plurality of alerting units 130a, 131a, 132a, 133a, 130b, 131b, and/or when any of the alerting units out of the plurality of alerting units 130a, 131a, 132a, 133a, 130b, 131b triggers sound alerts on other alerting units. In particular, this may be useful when the triggering of sound alerts is performed from a device with limited communication capabilities, e.g., due to power and/or networking limitations both with respect to band width and range.

The set of sensors 120a, 121a, 122a, 123a, 120b, 121b may comprise one or more sound sensors 280 which may measure the sound level at the location of the sensor. In this way, the ambient sound level around the one or more combination vehicles may be measured. The measured ambient sound level may be used to determine how well a sound alert will be distinguished around the one or more combination vehicles 101a, 101b. In this way, it may be possible to determine how a sound alert will be heard at a certain alerting distance from the measured sound. In a corresponding manner, the set of sensors 120a, 121a, 122a, 123a, 120b, 121b may also comprise one or more light sensors (not shown in FIG. 2). Each respective light sensor out of the one or more light sensors may measure the surrounding light level at its respective location. In this way, emitted light alerts from the respective light emitters 250 may be adapted to the surrounding light levels.

The set of sensors 120a, 121a, 122a, 123a, 120b, 121b may further comprise one or more position sensors 290. For example, the one or more position sensors 290 may comprise sensors that may scan the road and environment around the one or more combination vehicles 101a, 101b. The one or more position sensors 290 may comprise any one or more out of: one or more laser sensors, one or more cameras, one or more Light Detection and Ranging (Lidar) sensors, and one or more a Radio Detection and Ranging (Radar) sensors. The position sensors 290 may further comprise any other suitable sensor for scanning the surroundings of the one or more combination vehicles 101a, 101b. The one or more position sensors 290 may additionally or alternatively comprise networking equipment, which obtains positioning data, e.g. Global Positioning System (GPS) coordinates, from one or more road users in the vicinity of the one or more combination vehicles 101a, 101b, either from a server, e.g. communication with the control unit 150 over a wireless connections, or directly from the one or more road users which may communicate their respective position wirelessly with the control unit 150.

The set of sensors 120a, 121a, 122a, 123a, 120b, 121b may be built-in internal sensors of the plurality of alerting units 130a, 131a, 132a, 133a, 130b, 131b.

The set of sensors 120a, 121a, 122a, 123a, 120b, 121b may comprise sensors for detecting detect longitudinal motion direction of the one or more combination vehicle 101a, 101b. The set of sensors 120a, 121a, 122a, 123a, 120b, 121b, may additionally or alternatively comprises sensors for sensing any one or more out of:

a speed of the one or more combination vehicles 101a, 101b, a velocity of the or more combination vehicles 101a, 101b, a travel direction of the one or more combination vehicles 101a, 101b, an acceleration of the one or more combination vehicles 101a, 101b, an acceleration of any one or more of the one or more second vehicle units 111a, 112a, 111b, and a change in expected movement of the one or more combination vehicles 101a, 101b.

Figure 3:
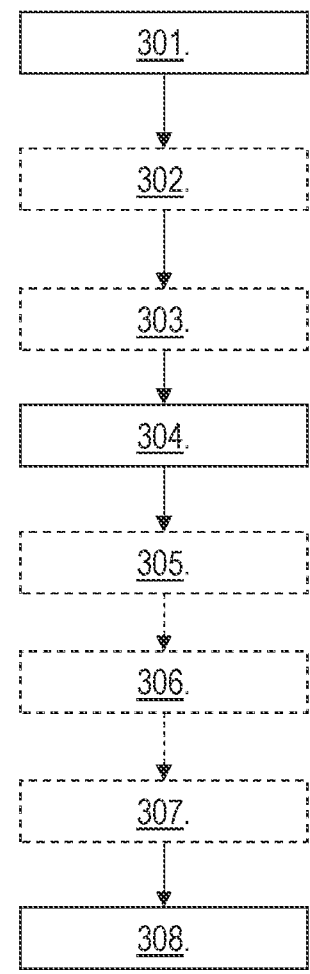
FIG. 3 is a flowchart illustrating a method according to embodiments herein.

FIG. 3 shows example embodiments of a method for alerting the presence of one or more combination vehicles 101a, 101b. Each combination vehicle out of the one or more combination vehicles 101a, 101b comprises a first vehicle unit 110a, 110b and one or more second vehicle units 111a, 112a, 111b. The one or more combination vehicles 101a, 101b is provided with a plurality of alerting units 130a, 131a, 132a, 133a, 130b, 131b. Each respective first vehicle unit 110a, 110b and each respective one or more second vehicle units 111a, 112a, 111b comprises a respective alerting unit out of the plurality of alerting units 130a, 131a, 132a, 133a, 130b, 131b. The method of FIG. 3 may in some embodiments be performed by the control unit 150, the master alerting unit, or any other suitable device with computing means and means for triggering a sound alert on the plurality of alerting units 130a, 131a, 132a, 133a, 130b, 131b. In some embodiments, as will be discussed further in the description, triggering the sound alert may be complemented with triggering a light alert.

The method comprises the following actions, which actions may be taken in any suitable order. Optional actions are referred to as dashed boxes in FIG. 3.

Action 301

The method comprises obtaining movement data from at least one data communicating unit comprised in any one of the one or more combination vehicles 101a, 101b. The movement data is indicative of one or both of a current movement or an expected movement of the one or more combination vehicles 101a, 101b. In other words, the movement data may indicate whether or not the one or more combination vehicles 101a, 101b is moving and/or whether or not the one or more combination vehicles 101a, 101b is about to move.

The data communicating unit may comprise any one or more sensors out of the set of sensors 120a, 121a, 122a, 123a, 120b, 121b. In these embodiments at least some sensors out of the set of sensors 120a, 121a, 122a, 123a, 120b, 121b may sense the movement and/or expected movement of the one or more combination vehicles 101a, 101b. Additionally or alternatively, the data communicating unit may comprise one or more vehicle management control units 141a, 141b, e.g. the first vehicle management control unit 141a. In some of these embodiments, the one or more vehicle management control units 141a, 141b may indicate, e.g. to the control unit 150, a current movement and/or expected movement of the one or more combination vehicles 101a, 101b, e.g. a speed or an acceleration of the one or more combination vehicles 101a 101b. In some of these embodiments, the current movement and/or expected movement obtained from the one or more vehicle management control units 141a, 141b may indicate a movement which the one or more vehicle management control units 141a, 141b is controlling the one or more combination vehicles 101a 101b to maintain and/or achieve, such as a travelling speed and/or direction.

In some embodiments, obtaining the movement data comprises obtaining a speed of the one or more combination vehicles 101a, 101b. In other words, the movement data may indicate the speed of the expected and/or current movement.

The movement data may comprise any suitable movement data of only one of the one or more combination vehicles 101a, 101b. In other words, in some embodiments, it may be sufficient to know only the movement of one of the one or more combination vehicles 101a, 101b. In some embodiments, the movement data may comprise movement data specific to any one or more out of the first vehicle units 110a, 110b and/or the one or more second vehicle units 111a, 112a, 111b.

In some embodiments, obtaining the movement data comprises obtaining movement data indicative of any one or more out of:
- a velocity of the one or more combination vehicles 101a, 101b, i.e., direction and speed,
- a travel direction of the one or more combination vehicles 101a, 101b, i.e., which direction is the one or more combination vehicles 101a, 101b moving or expected to move,
- an acceleration of the one or more combination vehicles 101a, 101b, e.g. how is the movement of the one or more combination vehicles 101a, 101b changing or expected to change,
- an acceleration of any one or more of the one or more second vehicle units 111a, 112a, 111b, and
- a change in expected movement of the one or more combination vehicles 101a, 101b, e.g. when shifting gear from neutral.

In some embodiments, the movement data is indicative of that a motion of the one or more combination vehicles is influenced by one or more surrounding vehicles, e.g. by an impact or by a communicated input about an imminent accident.

In some embodiments, the movement data is indicative of that a parking brake of the one or more combination vehicles 101a, 101b has been released.

In some embodiments, the change in expected movement may additionally or alternatively relate to braking. This may occur when braking such that an expected movement is to stop quickly, but the one or more combination vehicles 101a, 101b may continue to slide forward and/or sideways, e.g. due to slippery conditions. The change in expected movement may alternatively or additionally relate to steering, e.g. wherein the one or more combination vehicles 101a, 101b may not turn, e.g. quick enough, in the direction of which a driver is expecting the one or more combination vehicles 101a, 101b to turn. The change in expected movement may alternatively or additionally relate to that an initiated turn at one end of the one or more combination vehicles 101a, 101b results in an amplified motion at the other end of the one or more combination vehicles 101a, 101b. The change in expected movement may alternatively or additionally relate to an attempt to accelerate, e.g. wherein the one or more combination vehicles 101a, 101b may not succeed to accelerate as expected due to a lack of friction, e.g. resulting in a side-ways sliding motion of a part, e.g. any of the first or second vehicle units, of the one or more combination vehicles 101a, 101b in a direction not envisaged by the driver or different from the intended control of the one or more combination vehicles 101a, 101b.

In some embodiments, the movement data may indicate movement in any direction of the or more combination vehicles 101a, 101b, the one or more first vehicle units 111a, 112a, 111b and/or the one or more second vehicle units 111a, 112a, 111b. For example, the movement data may comprise a sideways motion of the one or more second vehicle units 111a, 112a, 111b. In this way, it is possible to detect it one of the one or more second vehicle units 111a, 112a, 111b moves faster in a sideways direction than other vehicle units which may cause a dangerous traffic situation and may need to be alerted.

Action 302

In some embodiments, the at least one data communicating unit comprises a set of sound sensors 280 configured to monitor sound at the one or more combination vehicles 101a, 101b. In some of these embodiments, the method comprises obtaining sound sensor data from the set of sound sensors 280. The sound sensor data may indicate the ambient noise levels around the one or more combination vehicles 101a, 101b. These ambient noise levels be used as a basis for determining how well sound from the plurality of alerting units 130a, 131a, 132a, 133a, 130b, 131b will travel, e.g. a certain distance and/or to a specific position.

Action 303

In some embodiments, the at least one data communicating unit comprises a set of position sensors 290 configured to monitor one or more positions of respective one or more road users surrounding the one or more combination vehicles 101a, 101b. In these embodiments, the method comprises obtaining one or more positions of the respective one or more road users surrounding the one or more combination vehicles 101a, 101b from the set of position sensors 290. The set of position sensors 290 may scan the road and environment around the one or more combination vehicles 101a, 101b, and/or obtain positioning data, e.g. GPS coordinates by means of communication with a server or with the road users.

Independently of how the positions of the respective one or more road users are obtained, based on the position sensor data it is possible to learn accurate and/or precise positions of where a sound alert must be well heard be able to notify the road users of the presence of the one or more combination vehicles 101a, 101b. As will be explained in later parts of the description, the same positions of the one or more road users may be used for directing light alerts.

Action 304

The method comprises determining the current movement and/or the expected movement of the one or more combination vehicles 101a, 101b based on the obtained movement data. For example, it may be determined that the one or more combination vehicles 101a, 101b is slowly moving in reverse, slowly forward, etc.

In some embodiments the method comprises determining that any of the one or more second vehicle units 111a, 112a, 111b have an unexpected sideways motion which may be dangerous.

In some embodiments, the method comprises determining that the one or more combination vehicle 101a, 101b, has shifted gear and will start to drive forward or in reverse.

In some embodiments, the method comprises determining that the one or more combination vehicle 101a, 101b, is sliding, e.g. without control, in any direction, e.g. due to surface topology, weather conditions or driving behaviour insufficiently adapted to the driving conditions.

Action 305

In some embodiments, the method comprises determining whether or not triggering the sound alert at a first sound volume is expected to fulfil a predetermined sound condition at an alerting distance from the one or more combination vehicles 101a, 101b. The first sound volume may be a first sound volume configuration. The first sound volume configuration may relate to that each alerting unit in the plurality of alerting units 130a, 131a, 132a, 133a, 130b, 131b has an independently set volume for its respective sound alert. The first sound volume configuration may also relate to that each alerting unit in the plurality of alerting units 130a, 131a, 132a, 133a, 130b, 131b has the same volume set for its respective sound alert.

The sound condition may comprise determining that a sound volume is high enough, e.g. higher than a predetermined sound volume threshold, at the alerting distance from the one or more combination vehicles 101a, 101b. In some embodiments, the sound condition may comprise ensuring that the sound alert is easily distinguishable from other sounds at the alerting distance. For example, the method may involve ensuring that the frequency of the sound alert is more than a predetermined frequency threshold different from frequencies of other dominant sounds in the area surrounding the one or more combination vehicles 101a, 101b.

The alerting distance as used herein may be a distance from the one or more combination vehicles 101a, 101b in one or more directions, e.g. a radius around the one or more combination vehicles 101a, 101b. When the sound condition is fulfilled at the alerting distance, it may also be considered fulfilled at shorter distances than the alerting distance.

The sound condition of the sound alert at the alerting distance may be determined based on which sound volume each respective alerting units out of the plurality of alerting units 130a, 131a, 132a, 133a, 130b, 131b is configured to emit the sound alert at. The sound condition at the alerting distance may further be determined based on the number of alerting units out of the plurality of alerting units 130a, 131a, 132a, 133a, 130b, 131b. Additionally or alternatively, the sound condition at the alerting distance may be determined based on a position of each respective alerting unit out of the plurality of alerting units 130a, 131a, 132a, 133a, 130b, 131b.

Furthermore, the sound condition at the alerting distance may be determined based on a frequency each respective alerting units out of the plurality of alerting units 130a, 131a, 132a, 133a, 130b, 131b is configured to emit the sound alert at. This may be since some frequencies may be easier to hear at the alerting distance in certain environments, e.g. within a city or within an open landscape.

Furthermore, the sound condition at the alerting distance may be determined based on how each respective alerting units out of the plurality of alerting units 130a, 131a, 132a, 133a, 130b, 131b may be able to direct their respective sound alerts. For example, when some alerting units direct their respective sound alerts towards the front of the one or more combination vehicles 101a, 101b, the sound from these alerting units, may travel better, i.e. longer without losing significant sound volume, in the forward direction of the one or more combination vehicles 101a, 101b.

In some embodiments, determining whether or not the triggering of the sound alert at the first sound volume is expected to fulfil the sound condition is based on the obtained sound sensor data. In these embodiments, the method may comprise determining whether or not the triggering of the sound alert at the first sound volume is expected to fulfil the sound condition on the basis of ambient sound levels around the one or more combination vehicles 101a, 101b e.g. as indicated by the sound sensor data. In this way it may be possible to determine e.g., in a certain direction of the one or more combination vehicles 101a, 101b, whether or not the sound alert at the first sound volume will fulfil the sound condition, i.e. if it will be heard well enough by the road users at the alerting distance.

In some embodiments, determining whether or not triggering the sound alert at the first sound volume is expected to fulfil the sound condition by determining whether or not triggering the sound alert at the first sound volume is expected to fulfil the sound condition in at least one position of the one or more positions of the respective one or more road users surrounding the one or more combination vehicles 101a, 101b. In this way, it is possible to more precisely take suitable action depending on whether or not the sound condition is fulfilled at the position of the respective one or more road users. For example, in some embodiments herein, the direction of the plurality of alerting units 130a, 131a, 132a, 133a, 130b, 131b may be directed towards a specific road user, e.g. towards the closest road user and/or if several road users, the plurality of alerting units 130a, 131a, 132a, 133a, 130b, 131b may be distributed to be directed toward different road users. Directing the plurality of alerting units 130a, 131a, 132a, 133a, 130b, 131b may be based on the obtained one or more positions of the respective one or more road users. In this way, the sound alert may be emitted to best notify the road users of the presence of the one or more combination vehicles 101a, 101b.

Action 306

In some embodiments, based on the movement data, the method may further comprise detecting whether the one or more combination vehicles 101a, 101b are travelling in reverse or forward.

Action 307

In some embodiments, when the triggering of the sound alert at the first sound volume is expected to not fulfil the sound condition, the method comprises adapting the sound alert to obtain a first adapted sound alert expected to fulfil the sound condition.

In other words, the first adapted sound alert is adapted to fulfil the sound condition. For example, this may relate to increasing the volume of the sound alert, e.g. at one or more of the plurality of alerting units 130a, 131a, 132a, 133a, 130b, 131b. In this way, the first adapted sound alert may be obtained with a higher sound volume than the sound volume of the sound alert. Additionally or alternatively, obtaining the first adapted sound alert may involve adapting the frequency of the sound alert, e.g. to obtain the first adapted sound alert with a higher and/or lower frequency than the sound alert. In this way the first adapted sound alert may be better heard at the alerting distance.

In some embodiments, the sound type of the first adapted sound alert is adapted from the sound alert. In some embodiments, the first adapted sound alert is periodic, e.g. with silent intermittent parts forming a first beeping sound. In some embodiments, the sound alert may comprise a combination of sound and voice messages.

In some embodiments, the movement data is indicative of an acceleration of at least one or more of the one or more second vehicle units 111a, 112a, 111b, e.g. as obtained in Action 301. In some of these embodiments, when the acceleration of one or more of the one or more second vehicle units 111a, 112a, 111b is above a predetermined acceleration threshold, the sound alert may be adapted to obtain a second adapted sound alert. Additionally or alternatively, the second adapted sound alert may be obtained when the movement data comprises a sideways motion of the one or more second vehicle units 111a, 112a, 111b above a predetermined sideways motion threshold.

The second adapted sound alert may be the sound alert adapted with increased sound volume and/or different frequency.

In some embodiments, adapting the sound alert may comprise turning off some alerting units, e.g. for a short time, and/or increasing the sound volume of other alerting units, e.g. for the same period of time. In this way, it is possible for one alerting unit to make up for the shortcoming of another alerting unit. Furthermore, it may alternatively or additionally be possible to create a sound pattern which is more easily detectable and understandable by road users. This may comprise e.g. the use of sound alerts that wander along the length of the one or more combination vehicle 101a, 101b or the use of staging, where the same sound alert is distributed earlier from a more distant alerting unit to make its location more evident for a road user compared to a closer alerting unit. The same approaches are applicable for triggering light alerts which will be discussed further in the description.

In some embodiments, the sound type of the second adapted sound alert is adapted from the sound alert. In some embodiments, the second adapted sound alert is periodic, e.g. with silent intermittent parts forming a second beeping sound, e.g. different from the first beeping sound.

In some embodiments, the second adapted sound alert may also comprise changing a sound character based on an increased urgency to inform a road user that gets steadily closer to the nearest part of the combination vehicle. Changing the sound character may comprise one or more changes to sound volume and/or frequency of the sound alert. In some embodiments the second adapted sound alert may comprise transitions among sound types such as noise-based sounds, tonal sounds, and/or voice messages. In some embodiments, corresponding approaches are applicable for light alerts, but with changes to light intensity, light frequency, and/or light colour.

Action 308

The method comprises triggering a sound alert on the plurality of alerting units 130a, 131a, 132a, 133a, 130b, 131b. When the sound alert is triggered, each alerting unit out of the plurality of alerting units 130a, 131a, 132a, 133a, 130b, 131b may each emit a sound for the sound alert by playing the sound alert using their respective sound emitter.

The sound alert is triggered when any one or both of the current movement and the expected movement is non-zero, and when any one or both of the current movement and the expected movement of the one or more combination vehicles 101a, 101b is/are less than at least one predetermined threshold. In other words, the sound alert is triggered when the one or more combination vehicles 101a, 101b is moving slowly or is about to move slowly. For example, the sound alert may be triggered when the movement of the one or more combination vehicles 101a, 101b is slowly moving forward or slowly reversing. The sound volume and/or frequency of the sound alert may be based on the speed or direction of motion of the one or more combination vehicle 101a, 101b. The sound alert may be a sound of a certain starting tone, e.g. a tonal sound, or a noise based sound consisting of a multitude of frequencies, and/or an adapted voice messages. In some embodiments, the sound alert is a sound which imitates a combustion engine. In some other embodiments, the sound alert comprises musical compositions and/or advertising jingles representing a specific product or business.

The sound alert may also be triggered when any one or more out of the one or more combination vehicles 101a, 101b are shifting gears, e.g. indicating a slow movement. For example, the gear of the first combination vehicle 101a may be shifted from neutral to reverse or from neutral to a forward gear, indicating that the one or more combination vehicles 101a, 101b will soon have a slow movement. In this way, it is possible to alert nearby road users of the upcoming movement of the one or more combination vehicles, giving the road users more time to take any necessary action. Such initiated movements may also arrive from external influences from other vehicles and/or stationary objects that influences the one or more combination vehicles 101a, 101b to not continue its motion as expected by other road users, e.g. due to collision or due to risk of collision.

In some embodiments, the at least one predetermined threshold comprises a speed threshold. In these embodiments, triggering the sound alert is performed when the speed of the one or more combination vehicles 101a, 101b, e.g. as obtained in Action 301, is less than the speed threshold.

In some embodiments, e.g., when the triggering of the sound alert at the first sound volume is expected to fulfil the sound condition, the method comprises triggering the sound alert at the first sound volume.

In some embodiments, e.g. when the triggering of the sound alert at the first sound volume is expected to not fulfil the sound condition, the method comprises triggering an adapted sound alert, e.g. the first adapted sound alert.

In some embodiments, e.g. when the acceleration of one or more of the one or more second vehicle units 111a, 112a, 111b is above the predetermined acceleration threshold, and/or when the sideways motion is above the predetermined sideways motion threshold, e.g. as in Action 301 and 307, the method comprises triggering the second adapted sound alert.

In some of these embodiments, only alerting units comprised in the one or more of the one or more second vehicle units 111a, 112a, 111b, or within a predetermined distance to the one or more of the one or more second vehicle units 111a, 112a, 111b may trigger the second adapted sound alert. In this way, an extra alert for vehicle units potentially accelerating out of control is triggered, improving the safety of surrounding road users.

In some embodiments, the first adapted sound alert is expected to fulfil the sound condition at the at least one position of the one or more positions of the respective one or more road users surrounding the one or more combination vehicles 101a, 101b. In other words, the first adapted sound alert has been adapted from the sound alert such that to ensure that the sound quality of the at least one position is sufficient for the respective one or more road users to be notified of the presence of the one or more combination vehicles 101a, 101b.

In some embodiments, sound alerts may be complemented with triggering light alerts. For example, the method may comprise triggering a light alert from the plurality of alerting units 130a, 131a, 132a, 133a, 130b, 131b. The light alerts may be triggered to further notify road users of the presence of the one or more combination vehicles. This may in particular be effective when road users have poor hearing or there is poor visibility in the area of the one or more combination vehicles 101a, 101b, e.g. during fog, rain, indoors with poor lighting such as in tunnels, during nights or evenings, during winter periods, etc.

In some embodiments, when the one or more combination vehicles 101a, 101b are travelling forward or is expected to travel forward, the method comprises triggering the sound alert on the plurality of alerting units 130a, 131a, 132a, 133a, 130b, 131b by triggering the sound alert with a first sound type. When the one or more combination vehicles 101a, 101b are travelling in reverse or is expected to travel in reverse, the method comprises triggering the sound alert on the plurality of alerting units 130a, 131a, 132a, 133a, 130b, 131b comprises triggering the sound alert with a second sound type. In other words, the sound alert may be triggered at a different sound type, depending on the direction the one or more combination vehicles 101a, 101b moves or is expected to move. The sound type may be a specific starting tone which is different between reverse and forward.

Figure 4A:
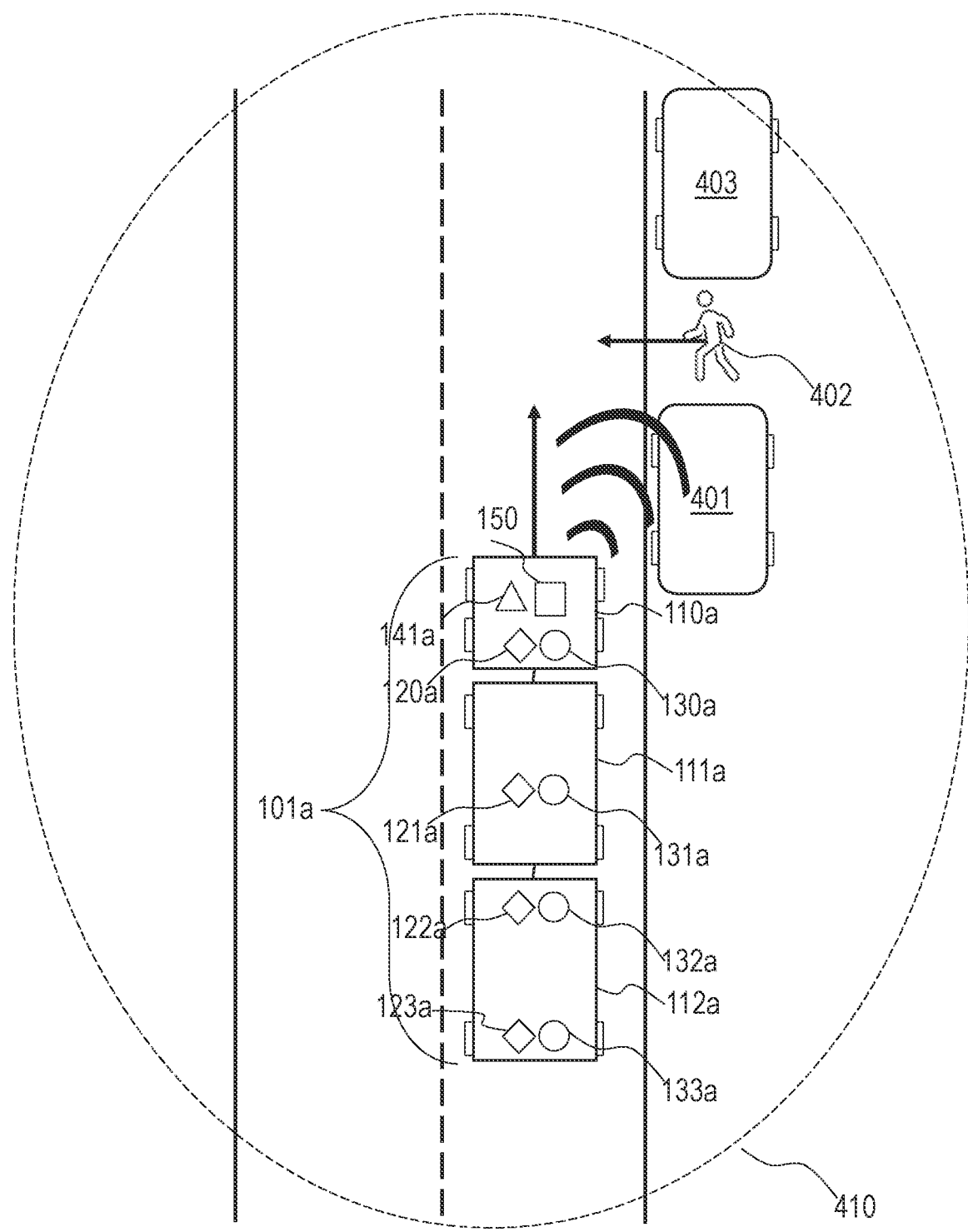
FIG. 4a and FIG. 4b are schematic block diagrams illustrating scenarios according to embodiments herein.

FIG. 4a illustrates an example scenario of embodiments herein. In this example scenario the one or more combination vehicles 101a, 101b comprises the first combination vehicle 101a, wherein the first combination vehicle 101a comprises the first vehicle unit 110a, and the two second vehicle units 111a, 112a. In the example scenario, the first vehicle unit 110a comprises an alerting unit 130a, a sensor 120a, the first vehicle management control unit 141a, and the control unit 150. The second vehicle units 111a, 112a illustrated in FIG. 4a comprises three alerting units 131a, 132a, 133a and three sensors 121a, 122a, 123a. In this example scenario, the first combination vehicle 101a is travelling forward at a low speed. In the example scenario, three road users 401, 402, 403 are arranged in the vicinity of the first combination vehicle 101a. Two road users are illustrated as parked cars 401, 402, e.g. which may be ready to turn out into the way of the approaching first combination vehicle 101a. One road user is illustrated as a person 402, e.g. which is about to walk across the road in which the first combination vehicle is driving. In this example scenario, the first combination vehicle 101a is driving slowly, and hence, the sound alert of the alerting units 130a, 131a, 132a, 133a is triggered to notify the road users 401, 402, 403 of the presence of the first combination vehicle 101a. In the example scenario, the control unit 150 determines whether or not the sound condition at an alerting distance 410 is fulfilled before triggering the sound alert. If the sound condition is expected not to be fulfilled at the alerting distance 410, the control unit 150 adapts the sound alert, e.g. as in Action 307, and triggers the first adapted sound alert which fulfils the sound condition at the alerting distance 401. When triggered, the alerting units 130a, 131a, 132a, 133a emits respective sound for the sound alert from their respective sound emitters. In this way, the road users 401, 402, 403 will be notified of the approaching first combination vehicle 101a, and thus may have enough time to react, and decide to halt before stepping or driving out in the way of the approaching combination vehicle 101a. Since the sound alert in the example scenario is triggered from four different alerting units, it is possible for the road users 401, 402, 403 to hear the sound from different locations and thus get an indication of the size and appearance of the first combination vehicle 101a. Furthermore, as the first combination vehicle 101a is travelling forward, the sound alert or first adapted sound alert is triggered with first sound type indicating that the first combination vehicle 101a is travelling forward.

Figure 4B:
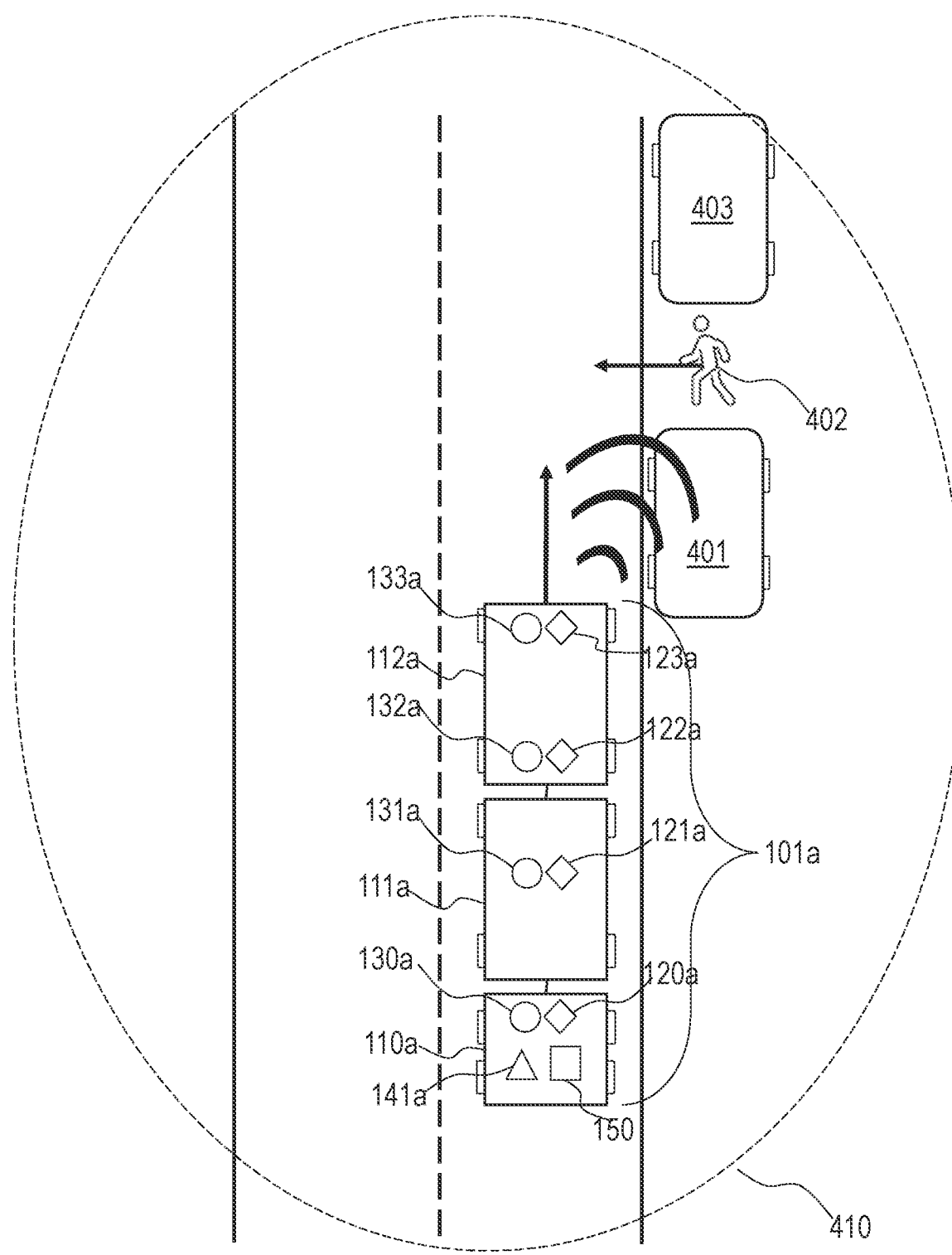

FIG. 4b illustrates an example scenario similar to the example scenario of FIG. 4a. However, in this scenario the first combination vehicle 101a is travelling in reverse at a slow speed. Similar to FIG. 4a, the control unit 150 determines whether or not the sound condition at the alerting distance 410 is fulfilled before triggering the sound alert. If the sound condition is expected not to be fulfilled at the alerting distance 410, the control unit adapts the sound alert, e.g. as in Action 307, and triggers the first adapted sound alert which fulfils the sound condition at the alerting distance 410. When triggered, the alerting units 130a, 131a, 132a, 133a emits respective sound for the sound alert from their respective sound emitters. Furthermore, as the first combination vehicle 101a is travelling in reverse, the sound alert or first adapted sound alert is triggered with second sound type indicating that the first combination vehicle 101a is travelling in reverse.

Light Alerts

As discussed in above Action 308, when triggering sound alerts from the plurality of alerting units 130a, 131a, 132a, 133a, 130b, 131b, additionally light alerts may also be triggered.

In some embodiments, the light alerts are triggered when determining that the sound alert from the plurality of alerting units 130a, 131a, 132a, 133a, 130b, 131b is not sufficient to notify road users 401, 402, 403 of the presence of the one or more combination vehicles 101a, 101b. For example, this may be when determining that the ambient sound level around the one or more combination vehicles 101a, 101b, is too loud for the sound condition at the alerting distance to be fulfilled, even if the sound alert were to be adapted with a higher sound volume.

In some embodiments, the light alerts may always be used when triggering sound alerts, e.g. as an extra notification of the presence of the one or more combination vehicles 101a, 101b.

The light alerts may, similar to the sound alerts, be directed toward one or more of the road users, e.g. based on the obtained position data of the one or more respective road users.

In some embodiments, only a subset the plurality of alerting units 130a, 131a, 132a, 133a, 130b, 131b may trigger light alerts.

The light alerts may, similar to the sound alert, be adapted, e.g. by increasing and/or decreasing light intensity and/or colour of the emitted light alert. Embodiments herein may comprise adapting the light alerts when adapting the sound alerts, e.g. as in action 307. Alternatively or additionally, adapting the light alerts may comprise determining a poor vision or hearing surrounding the one or more combination vehicles 101a, 101b, e.g. by means of sensor data obtained by the set of sensors, e.g. the set of sound sensors 280. In some of these embodiments, the sensor data may comprise light sensor data or sensor data indicative of the vision in the surrounding area of the one or more combination vehicles 101a, 101b. In some of these embodiments, the light emitters 250 of the plurality of alerting units 130a, 131a, 132a, 133a, 130b, 131b may be individually controlled position lights and which may depend on ambient light conditions.

In some embodiments, emitting light alerts may comprise triggering the one or more combination vehicles 101a, 101b to use their other lights as a light alert, e.g. using such as e.g. blinking, the brake lights and/or indicator lights of the one or more combination vehicles 101a, 101b.

For any of the embodiments which relates to triggering light alerts, corresponding features and embodiments as for triggering sound alerts may be applicable in a corresponding manner by adjusting any one or more out of: light direction, light intensity, light colour, and light frequency.

Mobile Device Alerts

Some embodiments herein may make use of a wireless vehicle to road user communication between the one or more combination vehicles 101a, 101b and the road users for transferring alerts about the presence of the one or more combination vehicles 101a, 101b to road users which are fully immersed in their respective mobile devices. In these embodiments, sound and/or light alerts are triggered by the mobile devices of the respective users when receiving an alert from the one or more combination vehicles 101a, 101b, via the wireless vehicle to road user communication. In this way, each respective road user may be notified of urgent alerts from the one or more combination vehicles 101a, 101b even when being immersed in its respective mobile device.

Modular Units

The plurality of alerting units 130a, 131a, 132a, 133a, 130b, 131b may be modular units that may be mounted on the one or more combination vehicles 101a, 101b by any suitable method, e.g. as described below for an example alerting unit.

Keyhole match for lockable units: The example alerting unit may be placed on a trailer has a shape that matches a corresponding pin or hole at the location on the trailer. Once put together, the example alerting unit may be locked in place. Like a key in a keyhole, each transport company may get an own pair of matching shapes, so the example alerting units may only be used on their vehicles.

Magnetic code lock: The example alerting unit may have a magnetic lock that gets activated from a passive part included within the fixation at the location on the trailer. In this way, a unique magnetic bracelet may be held against the lock which locks and may afterwards only be opened by that unique bracelet.

Automatically useless if removed from where it belongs: This function may minimize the interest of stealing alerting units. If the example alerting unit is removed from its intended combination vehicle, it stops working, and may only be restored by the owning company or the manufacturer that has a full record of which example alerting units belong to whom. The recognition may either be at the installation on the trailer, or that there is a local wireless communication network around that covers the combination vehicle, which detects if the example alerting unit is being removed.

Wireless bond between connected equipment: The function of the example alerting unit installed on the trailer does only work if the wireless communication bond is intact with the control unit 150 and/or the master alerting unit. Repeated confirmation requests may be sent from the control unit 150 and/or the master alerting unit with a certain frequency. These requests may then be answered by the example alerting unit installed on the trailer. If the example alerting unit on the trailer does not respond, a warning may be provided to a of the one or more combination vehicles 101a, 101b. This may prevent stealth but may also be used to verify the appropriate function of the example alerting unit.

To perform the method actions described herein, the control unit 150 may be configured to perform any one or more of the above actions 301-308. The control unit 150 may for example comprise an arrangement depicted in FIG. 5a and FIG. 5b.

The control unit 150 may comprise an input and output interface 500 configured to communicate with the entities of embodiments herein, such as e.g. the plurality of alerting units 130a, 131a, 132a, 133a, 130b, 131b, the set of sensors 120a, 121a, 122a, 123a, 120b, 121b, and/or the one or more vehicle management control unit 141a, 141. The input and output interface 500 may comprise a wireless and/or wired receiver (not shown) and a wireless and/or wired transmitter (not shown).

The control unit 150 may further be configured to, e.g. by means of an obtaining unit 510 in the control unit 150, obtain movement data from at least one data communicating unit comprised in any one of the one or more combination vehicles 101a, 101b, wherein the movement data is indicative of one or both of a current movement or an expected movement of the one or more combination vehicles 101a, 101b.

The control unit 150 may further be configured to, e.g. by means of the obtaining unit 510 in the control unit 150, obtain sound sensor data from the set of sound sensors 280, and/or obtain one or more positions of the respective one or more road users 401, 402, 403 surrounding the one or more combination vehicles 101a, 101b from the set of position sensors 290.

The control unit 150 may further be configured to, e.g. by means of a determining unit 520 in the control unit 150, based on the obtained movement data, determine the current movement and/or the expected movement of the one or more combination vehicles 101a, 101b, determine whether or not triggering the sound alert at a first sound volume is expected to fulfil a predetermined sound condition at an alerting distance 410 from the one or more combination vehicles 101a, 101b, determine whether or not triggering the sound alert at the first sound volume is expected to fulfil the sound condition, and/or determine whether or not triggering the sound alert at the first sound volume is expected to fulfil the sound condition in at least one position of the one or more positions of the respective one or more road users 401, 402, 403 surrounding the one or more combination vehicles 101a, 101b.

The control unit 150 may further be configured to, e.g. by means of an adapting unit 530 in the control unit 150, when the triggering of the sound alert at the first sound volume is expected to not fulfil the sound condition, adapt the sound alert to obtain a first adapted sound alert expected to fulfil the sound condition.

The control unit 150 may further be configured to, e.g. by means of the adapting unit 530, when the acceleration of the one or more out of the one or more second vehicle units 111a, 112a, 111b is above a predetermined acceleration threshold, adapt the sound alert to obtain a second adapted sound alert.

The control unit 150 may further be configured to, e.g. by means of a detecting unit 550 in the control unit 150, based on the movement data, detect whether the one or more combination vehicles 101a, 101b are travelling in reverse or forward.

The control unit 150 may further be configured to, e.g. by means of a triggering unit 540 in the control unit 150, when any one or both of the current movement and the expected movement is non-zero, and when any one or both of the current movement and the expected movement of the one or more combination vehicles 101a, 101b is/are less than at least one predetermined threshold, trigger a sound alert on the plurality of alerting units 130a, 131a, 132a, 133a, 130b, 131b as described in connection with the method above.

Figure 5A:
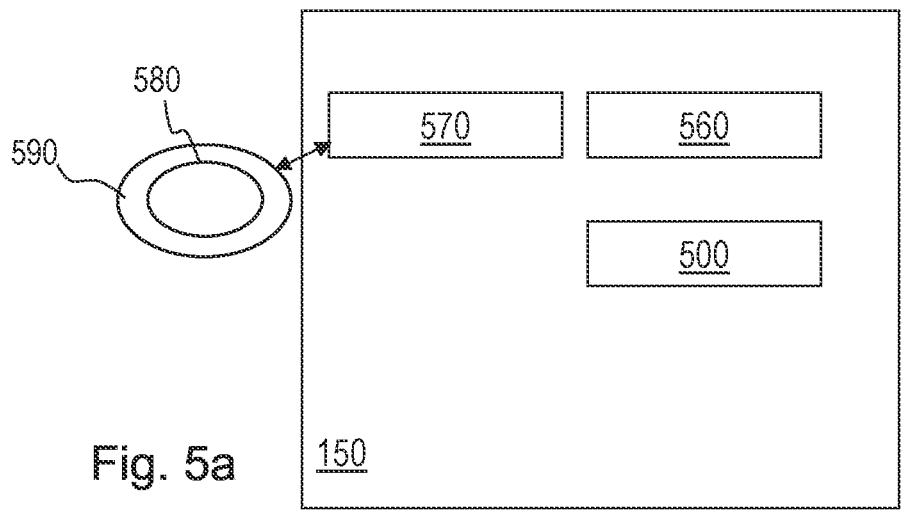
FIG. 5a and FIG. 5b are schematic block diagrams illustrating scenarios according to embodiments herein.
Figure 5B:
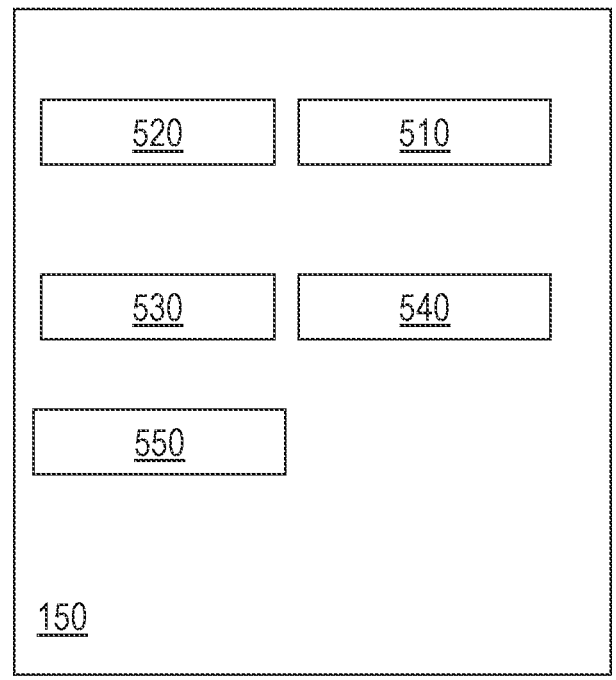

The embodiments herein may be implemented through a respective processor or one or more processors, such as the processor 560 of a processing circuitry in the control unit 150 depicted in FIG. 5a, together with respective computer program code for performing the functions and actions of the embodiments herein. The program code mentioned above may also be provided as a computer program medium, for instance in the form of a data computer readable medium carrying computer program code for performing the embodiments herein when being loaded into the control unit 150. One such computer readable medium may be in the form of a memory stick. The computer program code may furthermore be provided as pure program code on a server and downloaded to the control unit 150.

The control unit 150 may further comprise a memory 570 comprising one or more memory units. The memory 570 comprises instructions executable by the processor in control unit 150. The memory 570 is arranged to be used to store e.g. information, indications, data, configurations, and applications to perform the methods herein when being executed in the control unit 150.

In some embodiments, a computer program 580 comprises instructions, which when executed by the respective at least one processor 560, cause the at least one processor of the control unit 150 to perform the actions above.

In some embodiments, a respective computer readable medium 590 comprises the respective computer program 580, wherein the computer readable medium 590 is one of an electronic signal, an optical signal, an electromagnetic signal, a magnetic signal, an electric signal, a radio signal, a microwave signal, or a computer-readable storage medium.

Those skilled in the art will appreciate that the units in the control unit 150 described above may refer to a combination of analog and digital circuits, and/or one or more processors configured with software and/or firmware, e.g. stored in the control unit 150, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

It is to be understood that the present invention is not limited to the embodiments described above and illustrated in the drawings; rather, the skilled person will recognize that many changes and modifications may be made within the scope of the appended claims.

The invention claimed is:

1. A computer-implemented method for alerting the presence of one or more combination vehicles, wherein each combination vehicle out of the one or more combination vehicles comprises a first vehicle unit and one or more second vehicle units, wherein the one or more combination vehicles is provided with a plurality of alerting units, and wherein each respective first vehicle unit and respective one or more second vehicle units comprises a respective alerting unit out of the plurality of alerting units, the method comprising:
obtaining movement data from at least one data communicating unit comprised in any one of the one or more combination vehicles, wherein the movement data is indicative of one or both of a current movement or an expected movement of the one or more combination vehicles,
based on the obtained movement data, determining at least one of the current movement and the expected movement of the one or more combination vehicles, and
when any one or both of the current movement and the expected movement is non-zero, and when at least one of the current movement and the expected movement of the one or more combination vehicles is less than at least one predetermined threshold, triggering a sound alert on the plurality of alerting units, comprising:
determining whether triggering the sound alert at a first sound volume is expected to fulfill a predetermined sound condition at an alerting distance from the one or more combination vehicles,
when the triggering of the sound alert at the first sound volume is expected to fulfil the sound condition, triggering the sound alert comprises triggering the sound alert at the first sound volume, and
when the triggering of the sound alert at the first sound volume is expected to not fulfil the sound condition, adapting the sound alert to obtain a first adapted sound alert expected to fulfil the sound condition,
wherein triggering the sound alert comprises triggering the first adapted sound alert.

2. The method of claim 1, wherein obtaining the movement data comprises obtaining a speed of the one or more combination vehicles, wherein the at least one predetermined threshold comprises a speed threshold, and wherein triggering the sound alert is performed when the speed of the one or more combination vehicles is less than the speed threshold.

3. The method of claim 1, wherein the at least one data communicating unit comprises a set of sound sensors for monitoring sound at the one or more combination vehicles, and wherein the method further comprises:
obtaining sound sensor data from the set of sound sensors, and
determining whether triggering the sound alert at the first sound volume is expected to fulfil the sound condition is further based on the obtained sound sensor data.

4. The method of claim 1, wherein the at least one data communicating unit comprises a set of position sensors for monitoring one or more positions of respective one or more road users surrounding the one or more combination vehicles, and wherein the method further comprises:
obtaining one or more positions of the respective one or more road users surrounding the one or more combination vehicles from the set of position sensors, and
determining whether triggering the sound alert at the first sound volume is expected to fulfil the sound condition further comprises determining whether triggering the sound alert at the first sound volume is expected to fulfil the sound condition in at least one position of the one or more positions of the respective one or more road users surrounding the one or more combination vehicles,
wherein the first adapted sound alert is expected to fulfil the sound condition at the at least one position of the one or more positions of the respective one or more road users surrounding the one or more combination vehicles.

5. The method of claim 1, wherein the method further comprises triggering a light alert from the plurality of alerting units.

6. The method of claim 1, wherein obtaining the movement data comprises obtaining movement data indicative of any one or more out of:
a velocity of the or more combination vehicles,
a travel direction of the one or more combination vehicles,
an acceleration of the one or more combination vehicles,
an acceleration of one or more out of the one or more second vehicle units, and
a change in expected movement of the one or more combination vehicles.

7. The method of claim 6, wherein the movement data is indicative of an acceleration of one or more out of the one or more second vehicle units, and wherein the method further comprises:
when the acceleration of the one or more out of the one or more second vehicle units is above a predetermined acceleration threshold, adapting the sound alert to obtain a second adapted sound alert, wherein triggering the sound alert comprises triggering the second adapted sound alert.

8. The method of claim 1, wherein the method further comprises:
- based on the movement data, detecting whether the one or more combination vehicles are travelling in reverse or forward,
- when the one or more combination vehicles are travelling forward, triggering the sound alert on the plurality of alerting units comprises triggering the sound alert with a first sound type, and
- when the one or more combination vehicles are travelling in reverse, triggering the sound alert on the plurality of alerting units comprises triggering the sound alert with a second sound type.

9. A control unit configured to perform the method of claim 1.

10. An alerting arrangement for at least one combination vehicle, the alerting arrangement comprising the control unit of claim 9 and a plurality of alerting units arranged in communicative connection with the control unit, each alerting unit being configured to emit a sound alert in response to a triggering signal from the control unit.

11. The alerting arrangement of claim 10, wherein the control unit is arranged to be comprised in any one of the one or more combination vehicles, or wherein the control unit is arranged in one of the alerting units out of the plurality of alerting units.

12. A non-transitory computer program comprising program code means for performing the steps of claim 1 when the program is run on a computer.

13. A non-transitory computer readable medium carrying a computer program comprising program code means for performing the steps of claim 1 when the program product is run on a computer.

14. A combination vehicle comprising the alerting arrangement of claim 10.

* * * * *